(12) United States Patent
Wang et al.

(10) Patent No.: US 9,998,193 B2
(45) Date of Patent: Jun. 12, 2018

(54) BEAM FORMING IN A WIRELESS COMMUNICATION NETWORK

(71) Applicant: Telefonaktiebolaget LM Ericsson (publ), Stockholm (SE)

(72) Inventors: Min Wang, Luleå (SE); Jan Christoffersson, Luleå (SE); Mårten Ericson, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days. days.

(21) Appl. No.: 15/508,415

(22) PCT Filed: Sep. 4, 2014

(86) PCT No.: PCT/SE2014/051017
§ 371 (c)(1),
(2) Date: Mar. 2, 2017

(87) PCT Pub. No.: WO2016/036290
PCT Pub. Date: Mar. 10, 2016

(65) Prior Publication Data
US 2017/0250746 A1    Aug. 31, 2017

(51) Int. Cl.
*H04W 24/00*    (2009.01)
*H04B 7/06*    (2006.01)
(Continued)

(52) U.S. Cl.
CPC .......... *H04B 7/0617* (2013.01); *H04W 36/18* (2013.01); *H04W 52/245* (2013.01);
(Continued)

(58) Field of Classification Search
CPC ... H04B 7/0617; H04B 7/0619; H04W 36/18;
H04W 52/245; H04W 52/283; H04W 52/40; H04W 64/003; H04W 72/0413; H04W 72/0453; H04W 72/046; H04W 88/06; H04W 88/08; Y02B 60/50
(Continued)

(56) References Cited

U.S. PATENT DOCUMENTS

| 2001/0024173 | A1 | 9/2001 | Katz |
| 2014/0206406 | A1* | 7/2014 | Cordeiro ............ H04W 72/046 455/501 |

FOREIGN PATENT DOCUMENTS

WO    WO 0156192    *    1/2001

OTHER PUBLICATIONS

Unknown, Author, "Update of Technical Report on UMTS Heterogeneous Networks," Change Request, 3GPP TSG-RAN WG1 Meeting #75, R1-135849, San Francisco, CA, Nov. 11-15, 2013, 1-177.

* cited by examiner

*Primary Examiner* — Timothy Pham
(74) *Attorney, Agent, or Firm* — Sage Patent Group

(57) ABSTRACT

The present disclosure pertains to a method for beam forming in a wireless communication network, comprising determining an Uplink/Downlink (UL/DL) imbalance of a user equipment wirelessly connected or connectable to a first node of the wireless communication network and determining a location of the user equipment. The method also comprises controlling beam forming based on the determined UL/DL imbalance and the determined location utilizing at least an antenna arrangement controlled by and/or associated to the first node. There are also disclosed related methods, devices and arrangements.

15 Claims, 9 Drawing Sheets

(51) Int. Cl.
*H04W 64/00* (2009.01)
*H04W 52/28* (2009.01)
*H04W 52/24* (2009.01)
*H04W 52/40* (2009.01)
*H04W 36/18* (2009.01)

(52) U.S. Cl.
CPC ......... *H04W 52/283* (2013.01); *H04W 52/40* (2013.01); *H04W 64/003* (2013.01)

(58) Field of Classification Search
USPC .................................................. 455/456.1
See application file for complete search history.

BEAM FORMING IN A WIRELESS COMMUNICATION NETWORK

TECHNICAL FIELD

This disclosure generally pertains to methods and apparatuses for beam forming for or in a wireless communication network.

BACKGROUND

Increasing utilization of mobile broadband technology worldwide results in significantly increasing traffic volumes that need to be handled by the mobile or wireless communication networks (e.g. WCDMA/HSPA). Therefore, techniques that allow network operators to manage their network more efficiently are of large importance. Some approaches allowing, e.g., to improve the downlink performance, would be to introduce support for 4-branch MIMO, multiflow communication, multi carrier deployment etc. Since the spectral efficiency per link is approaching theoretical limits, it may be considered to improve the spectral efficiency per unit area. It is desirable that additional features for mobile networks, e.g. via networks based on HSDPA or LTE, provide a uniform user experience anywhere inside a cell, which may require changing the topology of traditional networks. For example, heterogeneous network deployments may be considered in this context.

Deployment of low-power nodes (LPNs) to form a heterogeneous network may be seen as a tool to meet the ever-increasing demand for mobile broadband services. A LPN may correspond, for example, to a remote radio unit (RRU), pico, femto or micro base station, allowing expanding the network capacity in a cost-efficient way. Note that the power transmitted by these LPNs may relatively small compared to that of macro base stations, e.g. 2 W as compared 20 W for a typical macro base station.

In the context of this description, a network comprising macro Nodes like eNodeBs and/or LPNs, and/or, more generally, nodes of differing transmitting power, which may serve at least partly the same cells and/or user equipments, may be referred to as a heterogeneous network. Two examples of use-cases for heterogeneous network deployment that may be envisioned are coverage holes and capacity enhancement for localised traffic hotspots. It may be considered a network as heterogeneous network if the user equipment identifies it and/or it appears to a user equipment as heterogeneous in regards to the relative transmitting power of the nodes of the network to the user equipment, which the user equipment may receive at different power levels. Generally, the transmitting power referred to herein may be a nominal and/or actual and/or maximum transmitting power of a node or terminal and/or in a cell. A user equipment may generally perceive a network with multiple nodes communicating with the user equipment as a heterogeneous network, e.g. if the power received from different nodes is different, in particular significantly different, e.g. due to the actual transmitted power of the nodes (e.g. due to transmitting power control) differing and/or due to differences in signal paths and/or distance between the user equipment and the node.

Deployed nodes like LPNs in a heterogeneous network are typically classified as either co-channel (or named as other terms e.g., separated cell), where each LPN has its own cell, which may have its own cell identity (e.g., primary scrambling code in UMTS network), or combined cell (or named as other term, e.g., soft cell) where the LPNs provide cells with the same cell identities as a Macro cell they are associated to.

FIG. 1 shows an example of co-channel deployment of a Macro station and an LPN. Employing low-power nodes in a macro cell in a co-channel fashion offers load balancing (by enabling traffic offloading to LPNs), which may bring large capacity gain, both regarding average system throughput and regarding cell edge user throughput.

In a heterogeneous network, the DL transmission power of the one or more of the nodes or cells, in particular that of one or more macro nodes or cells, may be significantly higher than that of other node or cells, in particular of LPNs. This may create an imbalance region where the power received by a user equipment or other entity via a DL from a first node, e.g. a macro node, it is in wireless communication with is higher than the power received by the same user equipment via a, possibly simultaneous, downlink connection from a second node, e.g. an LPN or another node, e.g. a more distant macro node, but the uplink connection to the second node like the LPN or correspondingly, the other node, is better, in particular in terms of power received by the respective node from the user equipment or other entity, than the uplink connection to the macro node, e.g. in cases the user equipment is closer in distance to the LPN than to the macro node. The other entity may be a mobile or non-mobile entity or node capable of and/or in wireless communication with one or more nodes of the wireless communication network. The other entity may for example be a network node, in particular a LPN, and/or a relay node and/or access point and/or a micro node and/or a pico node and/or a femto node.

If the user equipment or other entity is in an imbalance region, but not in a SHO (SHO=Soft HandOver) area, the UE is power controlled by first node, e.g. a Macro node or cell, such that the first node or Macro node or cell determines the uplink transmission power of the user equipment or other entity. In this case, the UE uplink transmission to the first node and/or in the corresponding cell, e.g. the Macro cell, may create high interference to the second node, e.g. the LPN node, which may be much closer physically to the user equipment or other entity than the controlling first or Macro node.

If the UE is in SHO, its UL power control may be handled jointly by the first and second node, e.g. a macro node and a LPN. However, due to the much better UL to the LPN, it will effectively be controlled by the LPN. If the first node or macro node is or provides the serving cell, the power received by the first node from the UE or other entity via the UL connection may lower than desired or useful. This may lead to inadequate reception via an UL control channel, e.g. via HS-DPCCH (High Speed Dedicated Physical Control Channel, which carries the DL channel quality indication (CQI), and HARQ (Hybrid Automatic Repeat Request) acknowledgement), which in turn may lead to inefficient or ineffective communication via a corresponding DL channel, e.g. via HS-DSCH (High Speed Downlink Shared Channel). Another issue has been observed is that E-DPCCH (E-DCH Dedicated Physical Control Channel) may suffer from the reduced reliable transmission of the happy bit, which in turn leads to the degraded EUL (Enhanced Uplink) data rate.

In cases where the LPN offload is increased by small cell range expansion, an even higher imbalance may create high interference for UEs served by the LPN, which may lead to reduced DL throughput. FIG. 2 illustrates an example of a corresponding imbalance region.

Several solutions to combat the negative effects of the UL/DL imbalance are known. These methods for example include power boosting of UL control channels, inner-loop power control restrictions and introduction of a secondary pilot. These methods are applicable for legacy UEs and to some extent create additional UL overhead from the added or enhanced control channels. Other methods such as E-DCH (Enhanced Dedicated Channel) decoupling can improve the reception of or via the E-DPCCH (E-DCH Dedicated Physical Control Channel), hence may improve the E-DCH transmission by directly serving a UE via LPN. However, it doesn't fix the issue of the robustness of UL control channel reception at the Macro cell. This means that E-DCH decoupling does not solve the imbalance issues for the control channels, it merely enhances the E-DCH transmissions by moving the UL scheduling to the LPN instead of the macro node.

Another alternative which to some extent aims to limit the UL/DL imbalance is to use a DF-DC (Dual Frequency-Dual Cell) approach with reduced macro power on the second carrier. This is a rather special case which involves two carriers. However, the DF-DC does not give an offloading gain compared to DC operation, and there is an additional cost of doubled signaling overhead for DF-DC due to that both carriers may have to perform measurements and the serving cell change independently. Furthermore, reducing transmission power on the second carrier may reduce performance for legacy UE served on the carrier subject to power reductions.

SUMMARY

It is an object of the present disclosure to describe methods and apparatuses or arrangement allowing improved handling of UL/DL imbalance situations, in particular in the context of heterogeneous networks.

This object is achieved with the features of the independent claims. Refinements and further embodiments are referred to in the dependent claims and this specification.

There is described a method for beam forming in a wireless communication network, comprising determining an Uplink/Downlink (UL/DL) imbalance of a user equipment wirelessly connected or connectable to a first node of the wireless communication network. The method further comprises determining a location of the user equipment; and controlling beam forming based on the determined UL/DL imbalance and the determined location utilizing at least one antenna arrangement controlled by and/or associated to the first node.

Also, there is described a node arrangement for a wireless communication network, comprising an antenna arrangement connected or connectable to a node of the node arrangement and control circuitry of a control node of the node arrangement, the control circuitry being arranged to control signaling utilizing the antenna arrangement. The control circuitry is adapted to control beam forming utilizing the antenna arrangement based on a determination of a location of at least one user equipment wirelessly connected or connectable to the node arrangement and based on a determination of an UL/DL imbalance of the at least one user equipment.

Moreover, there is described a base station for a wireless communication network, the base station being adapted for determination of a location of at least one user equipment to which the base station is wirelessly connected or connectable, the base station further being adapted for determination of an UL/DL imbalance of the at least one user equipment.

The base station is adapted for control of beam forming based on the determination of the location and the determination of the UL/DL imbalance of the at least one user equipment.

A user equipment for a wireless communication network is described, the user equipment being wirelessly connected or connectable to at least a first base station and a second base station of the wireless communication network. The user equipment is adapted to enter a soft handover state with the first base station and the second base station upon reception of a corresponding message from the network and/or a control node, and/or the first base station and/or the second base station, based on determination of the location of the user equipment and determination of the user equipment being having UL/DL imbalance regarding at least the first base station and the second base station.

There is also described a system for a wireless communication network, comprising at least one node arrangement as described herein and/or one base station as described herein and/or at least one control node as described herein and/or at least one user equipment as described herein and/or which is arranged to perform a method as described herein.

Moreover, a storage medium is described. The storage medium is readable by control circuitry, the storage medium being adapted for storing code executable by the control circuitry, the code causing the control circuitry to control performing of any one of the methods as described herein.

A program product comprising instructions is described, the instructions being executable by control circuitry, the instructions causing the control circuitry to control performing of any one of the methods described herein when executing the instructions.

Also, there is described a control node for a wireless communication network, the control node comprising a location determining module adapted to determine the location of a user terminal and an UL/DL imbalance determining module adapted to determine an UL/DL imbalance of the user terminal as well as a beam forming module adapted to control beam forming based on the determined location and the determined UL/DL imbalance.

BRIEF DESCRIPTION OF THE DRAWINGS

The drawings show example implementations of methods and arrangements for beam forming in a wireless communication network to illustrate concepts of this disclosure.

There are shown in.

DETAILED DESCRIPTION

Figure 1:
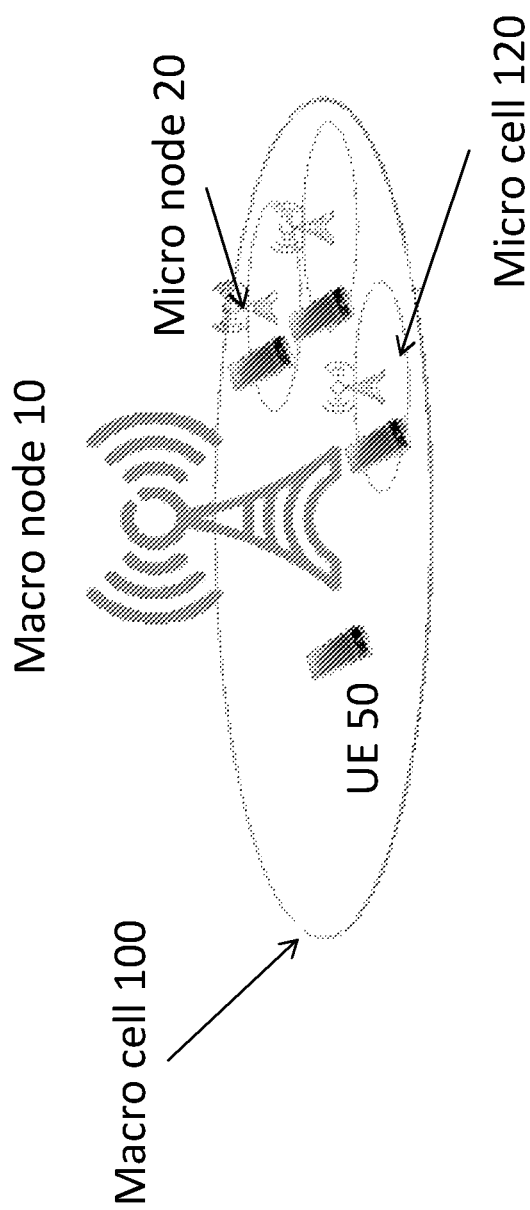
FIG. 1 a heterogeneous wireless communication network.

In the context of this specification, beam forming is suggested to change and/or equalize and/or remove and/or lower a UL/DL imbalance of a user equipment in wireless communication connection with at least two nodes of a wireless communication network. UL/DL imbalance may refer to a relation between UL and/or DL conditions for the user equipment in respect to either of the nodes and/or at least two of the nodes. The relationship may be parametrised depending on one or more parameters, in particular signal strength, signal-to-noise ratio, power transmitted and/or power received (alternatively or additionally, power density may be used). The relationship may be represented by a ratio of respective parameters, e.g. a ratio of power transmitted to a first node by the user equipment to power received from the first node by the user equipment. Beam forming may be controlled to change either of this conditions for UL and DL, for either of the nodes or for at least two of the at least two nodes. Generally, beam forming may be utilised in receiving and/or transmitting to lower or increase at least one of the parameters for a node it is performed for, e.g. lower or increase the signal strength, signal-to-noise ratio, power transmitted (power within the beam or power density within the beam), power received. For example, beam forming for a macro node may be controlled to increase the signal-to-noise ratio of the signals received by the node from the user equipment (improving UL conditions) by beam forming on the receiving side of the macro node. Alternatively or additionally, beam forming on the transmitting side of the macro node may be performed, e.g. forming a beam with lower power transmitted to the user equipment. Generally, beam forming may be controlled to determine and/or set and/or amend the UL/DL imbalance of a user equipment in respect to at least two nodes, e.g. to equalize the UL/DL imbalance and/or at least one parameter in respect to at least both nodes, e.g. for DL transmissions from the nodes. UL/DL imbalance may represent the UL/DL conditions respectively the above-mentioned relationship in regards to the nodes individually or taken together.

In the context of this specification, beam forming may be a technique of shaping antenna radiation pattern into desired forms, for example beams, and may be performed in transmitting and/or receiving. In particular in receiving, a beam may refer to a direction-based selection of the radiation pattern by control circuitry. Radiation beams from antennas can be used to control, in particular to increase and/or concentrate, or in the alternative, lower, the transmitted/received signal energy or power and/or to steer it in specific directions. It may be considered that beam forming is controlled to move a soft handover region between nodes and an imbalance region relative to each other and/or to change them in size, e.g. to move them closer together and/or to increase overlay of such regions.

Beam steering/shaping may be achieved by using an array antenna consisting of several distinct antenna elements. An array antenna may be considered to be an example for an antenna arrangement. These can be for example be arranged along a line (1-dimensional) or arranged in a 2-dimensional grid, or in a 3 dimensional arrangement, e.g. an arrangement or orthogonal loops or rods. An array antenna may generally be considered to be an example of an antenna arrangement. The actual steering/shaping of a beam may be achieved by altering the phase and/or amplitude of the signals transmitted from (or received at) the individual antenna elements of an antenna arrangement so that they are combined constructively in the desired direction. For the sake of simplicity, the following discussion focuses on transmit-side beam forming. The concept is analogous on the receive side, only "backwards" in that wave energy is received instead of transmitted.

In a simple transmission system, there may be arranged a radio or radio circuitry and/or a corresponding control circuitry adapted to produce a time-domain signal that is fed to a transmit antenna arrangement, which may comprise a plurality of different antenna elements. The conceptually simplest way to implement beam forming is to add a "beam forming module" between the radio and the antenna, which comprises an arrangement of individually controllable antenna elements, for example an array of some configuration. The beam forming module may be implemented as part of the control circuitry.

The beam forming module may be adapted to take the time-domain signal from the radio or radio circuitry and may multiplex it over all antenna elements. In order to achieve the desired beam forming, the signals to different antenna elements may each have different phase and/or amplitude, e.g. altered and/or shifted by the beam forming module. This corresponds to complex multiplications if the time-domain samples are also complex.

Figure 3:
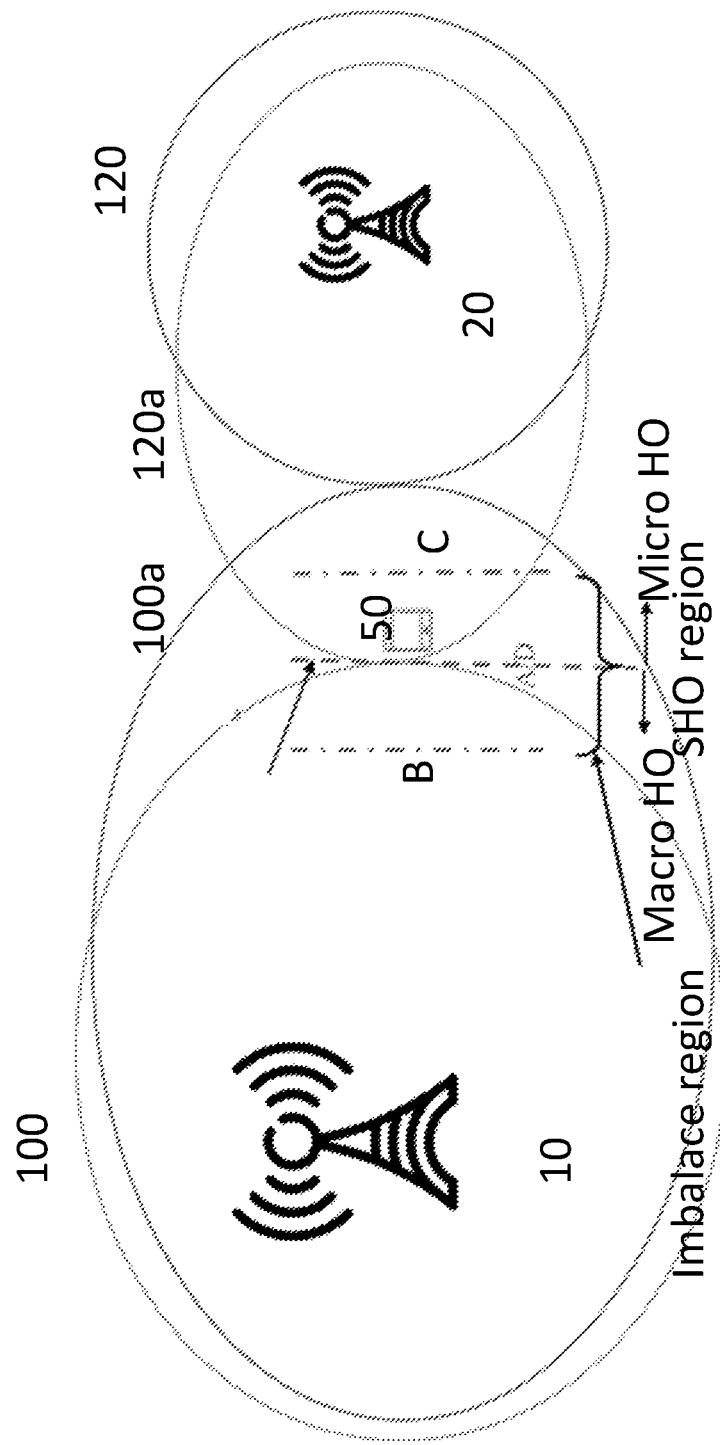
FIG. 3 the effect of beam forming on an imbalance region.

Note that this approach of creating beam forming/steering produces the same beam (e.g. in terms of spatial dimensions and temporal behavior) for the entire frequency band over which the signal is defined, since it is the time-domain signal that is altered on its way to the different antenna elements. This method may be called "analog beam forming", although the term "time-domain beam forming" may also be used. An alternative approach to beam forming is to apply phase and amplitude adjustments in the frequency domain. This is often called "digital beam forming". FIG. 3 illustrates an example. As an example, the time/frequency grid of an OFDM-based (Orthogonal Frequency Division Multiplexing) system is shown, in this case an LTE (Long-Term Evolution, a telecommunication standard) system. The data to be transmitted is mapped as complex numbers to each subcarrier in an OFDM symbol, which is then transformed to the time-domain via an IFFT (Inverse Fast Fourier Transform), e.g. utilizing a suitably adapted IFFT processing or control circuitry, before it is passed to the radio or radio circuitry.

To implement beam forming in the frequency domain, individual beam forming modules may be inserted in front of the IFFT or respective circuitry of the individual antenna elements. This may allow access to the individual subcarriers of the frequency bandwidth or carrier frequencies to be transmitted; thus, beam forming adjustments may be applied individually per subcarrier, allowing different beams to be formed for different subcarriers. Accordingly, beam forming may be made user- and/or channel-specific. If a member or node of a wireless communication network like a user equipment (UE) is scheduled on a number of resource blocks, the subcarriers in these resource blocks may all be given the adjustments that make them belong to the same beam pointing at this UE and/or member and/or beam forming may be performed such that the subcarriers of the resource blocks assigned to the same member or user equipment essentially form the same beam and/or are subjected to the same alignments of phase and/or amplitude.

The increased flexibility of this approach may require, since the data streams going to the different antenna elements are created in the frequency domain, that individual antenna elements have associated to them their own IFFT processing circuitry and radio circuitry. This may lead to an increase in processing requirement and hardware complexity compared to a time-domain beam forming approach. Hence, broadly speaking, the choice between time- or frequency-domain beam forming may be a performance/flexibility vs. processing capacity/complexity trade-off.

There is described a method for beam forming in a wireless communication network, comprising determining an Uplink/Downlink (UL/DL) imbalance of a user equipment wirelessly connected or connectable to a first node of the wireless communication network. The method further comprises determining a location of the user equipment; and controlling beam forming based on the determined UL/DL imbalance and the determined location utilizing at least a first antenna arrangement controlled by and/or associated to the first node. The UL/DL imbalance may be lowered and/or adapted and/or changed utilizing beam forming. Determining an UL/DI imbalance may be performed by an imbalance determining module, which may be module of and/or implemented on a node of the wireless communication network. The method may be performed by a control node, which may be the first node and/or be implemented as a node described herein.

Controlling beam forming may comprise forming a transmission beam covering the user equipment, the power transmitted to the user equipment by the transmission beam being controlled based on the determined UL/DL imbalance. In particular, the power of the transmission beam, which may be a transmission beam controlled by the first node and/or being formed utilizing the antenna arrangement may be increased or lowered in the part of the radiation pattern covering the user equipment.

Alternatively or additionally, controlling beam forming may comprise forming a receiving beam covering the user equipment. This may increase the signal-to-noise ratio of uplink transmissions from the user equipment received by the first node, which may reduce UL/DL imbalance. The receiving beam may be a virtual beam based on selection of signals received via the antenna arrangement.

The wireless communication network may comprise and/or form a heterogeneous network including at least the first node and a second node, to which the user equipment may be wirelessly connected or connectable, the first node and the second node differing regarding their transmission power for transmission to and/or distance from the user equipment the user equipment from the first node differing from the power received by the user equipment from the second node. The difference in transmission power may in particular be in regards to maximum transmission power or nominal transmission power. It may be considered that the user equipment is in a Soft-Handover Mode with the first and second node. The first node may be a macro node. Alternatively or additionally, the second node may be a LPN. In such a setup, which may be considered a heterogeneous network, UL/DL imbalance may lead to undesired frequent handovers.

In one variant, the first node and/or a second node is a base station of the wireless communication network, in particular an eNodeB, e.g. according to a LTE standard.

Determining the location of the user equipment may generally comprise fingerprinting. This may complementary to at least one other location determining method, e.g. a GPS-based method, or be a stand-alone approach.

Generally, controlling beam forming may be based on evaluating the connection status of a plurality of user equipments connected or connectable to the first node. In particular, controlling beam forming may be performed based on the needs and/or requirements and/or presence and/or number of user equipments in wireless communication with the first node. Controlling beam forming may be performed such that the connection quality, in particular the signal strength, to one or more other user equipments, does not suffer and/or fall below pre-determined conditions or threshold values, in particular conditions and/or threshold values regarding downlink transmitting power and/or signal strength and/or quality or signal-to-noise ratio and/or power received or receivable by the one or more other user equipments.

There is also disclosed a node arrangement for a wireless communication network, the node arrangement comprising an antenna arrangement connected or connectable to a node of the node arrangement, and control circuitry of a control node of the node arrangement. The control circuitry is arranged to, and/or comprises a control module for, control of signaling utilizing the antenna arrangement, e.g. by being connected or connectable to the antenna arrangement and/or by being arranged to control a power supply and/or to control reception via the antenna arrangement. The control circuitry is further adapted to, and/or comprises a beam forming module for, control of beam forming utilizing the antenna arrangement based on a determination of a location of at least one user equipment wirelessly connected or connectable to the node arrangement and based on a determination of an UL/DL imbalance of the at least one user equipment. The control circuitry and/or beam forming module may be adapted to control beam forming to form a radiation pattern in relation to the user equipment. The node arrangement may be adapted to perform any one of the methods for beam forming in a wireless communication network as described herein. The beam forming module may be implemented as a sub-module of the control module. The control node may comprise a location determining module for determining the location and/or an imbalance determining module for determining the imbalance, which may be sub-modules of the control module or independent or separately implemented. The wireless communication network and/or the user equipment and/or nodes may be any one of the respective wireless communications networks and/or user equipments and/or nodes described herein. It may be considered that the control node is the node to which the antenna arrangement is connected or connectable. Alternatively or additionally, an antenna arrangement (which may be a second antenna arrangement) may be connected or connectable to a node different from the control node. It may be considered that the control circuitry is adapted to control signaling utilizing such an antenna arrangement, in particular a second antenna arrangement (e.g., the control may be utilizing the antenna arrangement and the second antenna arrangement). The control node may be defined by the functionality of controlling beam forming. It may be considered that the control node is implemented as one of base station, eNodeB, terminal, user equipment, macro node, low-power node, relay node. The node arrangement may comprise the control node with control circuitry and the antenna arrangement, as well as one or more other nodes, in particular one or more LPNs.

The control circuitry may be adapted to control beam forming such that a transmission beam covering the user equipment is formed, the power transmitted for the user equipment by the transmission beam being controlled based on the determined UL/DL imbalance.

The beam forming may comprise forming a receiving beam covering the user equipment.

The antenna arrangement may be connected to and/or comprised in the control node. Alternatively, the antenna arrangement may be implemented separately.

In one variant, the node arrangement may comprise or be comprised in a heterogeneous network including at least a first node and a second node wirelessly connected or connectable to the user equipment, the first and the second node differing regarding their transmission power and/or location. The control node may be the first or second node or be a different node, which may be adapted to control the first node and/or second node, e.g. by signaling and/or control message, e.g. RRC signaling or messages.

The control node may be a base station of or for the wireless communication network, in particular an eNodeB, or a macro node or a higher-level node, e.g. a RNC (radio network controller).

The node arrangement and/or the control node and/or control circuitry may be adapted to determine the location of the user equipment based on fingerprinting.

The control circuitry may be adapted for evaluation, based on the connection status of a plurality of user equipments wirelessly connected or connectable to the node arrangement, whether and/or how to control beam forming. The connection status may be received from one or more other nodes, e.g. one or more of a macro node or base station or LPN in wireless connection with the user equipment, e.g. in a soft handover situation, and/or determined and/or evaluated by the control node, in particular the control circuitry of the control node. The control circuitry and/or control node may be adapted to determine and/or receive the connection status.

There is described a base station for a wireless communication network, the base station being adapted, and/or comprising a location determining module, for determination of a location of at least one user equipment to which the base station is wirelessly connected or connectable, the base station further being adapted, and/or comprising an imbalance determining module, for determination of an UL/DL imbalance of the at least one user equipment, wherein the base station is adapted, and/or comprises a beam forming module, for control of beam forming based on the determination of the location and the determination of the UL/DL imbalance of the at least one user equipment. The wireless communication network and/or the user equipment and/or nodes may and/or base station may be any one of the respective wireless communications networks and/or user equipments and/or nodes and/or base stations described herein. The base station may be an eNodeB or macro node or LPN or micro, pico or femto node. It may be considered that the base station is a control node as described herein.

The base station, in particular the beam forming module, may be adapted for control of beam forming such that a transmission beam covering the user equipment is formed, the power transmitted for the user equipment by the transmission beam being adapted based on the determined UL/DL imbalance.

The base station, in particular the beam forming module, may be adapted for control of beam forming such that a receiving beam and/or a transmitting beam covering the user equipment is formed.

It may be considered that the base station comprises and/or is connected or connectable to an antenna arrangement controllable and/or utilizable for beam forming, in particular controllable and/or utilizable for beam forming by the base station, e.g. the beam forming module.

In one variant, the base station may be connected or connectable to a second base station, which may be wirelessly connected or connectable to the at least one user equipment, the second base station having different transmission power and/or location than the base station. The connection between the base station and the second base station may be adapted to allow communication and/or control signaling in particular from the base station to the second base station, e.g. control signaling for controlling beam forming utilizing a second antenna arrangement of and/or connected to the second base station, which may be used alternatively or additionally to the antenna arrangement connected or connectable to the base station.

The base station may be a macro node for or of a wireless communication network and/or be an eNodeB.

It may be considered that the base station is adapted, and/or comprises a location determining module, for determination of the location of the user equipment based on fingerprinting.

The base station may be adapted for control of beam forming based on evaluation of the connection status of a plurality of user equipments wirelessly connected or connectable to the base station. Beam forming may take into account the presence and/or operation conditions of such other user equipments.

Moreover, there is described a user equipment (UE) for or of a wireless communication network, the user equipment being wirelessly connected or connectable to at least a first base station and a second base station or node of the wireless communication network, the user equipment being adapted to enter, and/or comprising a control module for entering, a soft handover state or modus with the first base station and the second base station or node upon reception of a corresponding message or command from the wireless communication network and/or a control node of the wireless communication network, e.g. the first base station and/or the second base station, based on determination of the location of the user equipment and determination of the user equipment being having UL/DL imbalance regarding at least the first base station and the second base station. It may be considered that the user equipment comprises a reception module for receiving the corresponding message or command. The wireless communication network and/or the user equipment and/or nodes and/or base stations may be any one of the respective wireless communications networks and/or user equipments and/or nodes described herein. Any device or node or terminal adapted and/or able to enter a soft handover mode with at least two nodes or base stations may be considered as user equipment in the context of this specification. The wireless communication network and/or the control node may be adapted to transmit and/or provide the command to the user equipment based on and/or after and/or during and/or for a period in which beam forming is performed to adapt and/or control and/or lower UL/DL imbalance. In one variant, the first base station may be an eNodeB and/or the second base station may be a LPN.

The user equipment may be adapted to provide, and/or comprise a UL location module for providing, the control node and/or first base station and/or the second base station with information regarding its location upon determination of the UL/DL imbalance. The user equipment may be adapted to perform, and/or comprise a UE imbalance module for, the determination of the UL/DL imbalance and/or provide corresponding information to the control node and/or first base station and/or second base station. The user equipment and/or UL location module may be adapted to determine the location of the user equipment and/or to determine corresponding information, e.g. fingerprint information and/or movement information and/or GPS or satellite navigation based information, which may be provide a basis for determining the location. UL/DL imbalance determining may be determined by the user equipment or the corresponding UL imbalance module, and/or it may be determined by at least one node of the wireless communication network, e.g. the control node and/or first base station or second base station.

There is also described a system for a wireless communication network, comprising at least one node arrangement as described herein and/or at least one base station or and/or control node as described herein and/or at least on user equipment as described herein and/or arranged to perform any one of the methods described herein. The wireless communication network and/or the user equipment and/or nodes and/or node arrangement and/or base station and/or control node may be any one of the respective wireless communications networks and/or user equipments and/or nodes and/or node arrangements and/or base stations and/or control nodes described herein. The system may be connected or connectable to and/or comprise a core network, e.g. an Evolved Package Core, and/or one or more higher layer nodes of a core network, e.g. via a cable connection for communication of data.

There is also described a storage medium readable by control circuitry, the storage medium being adapted for storing code executable by the control circuitry, the code causing the control circuitry to control performing of any of the methods described herein when executing the code. The control circuitry may be any of the control circuitries described herein.

In addition, there is described a program product comprising instructions executable by control circuitry, the instructions causing the control circuitry to control performing of any of the methods described herein when executing the instructions. The control circuitry may be any of the control circuitries described herein.

Moreover, there is described a control node for a wireless communication network, the control node comprising a location determining module or location module for determining the location of a user terminal, an UL/DL imbalance determining module or imbalance module for determining an UL/DL imbalance of the user terminal and a beam forming module for controlling beam forming based on the determined location and the determined UL/DL imbalance. The control node may comprise any of features of any control node as described herein.

FIG. 1 shows an example of a heterogeneous wireless communication network in co-channel arrangement, with a macro node 10 defining and/or serving a macro cell 100. Micro nodes 20, which may be seen as examples of nodes, in particular low-power nodes (LPNs), may define and/or serve associated micro cells 120. There are also shown user equipments (UEs) 50 connected to the respective cells 100 or 120. The macro node 100 and the micro nodes 20 may be seen as examples of node of the wireless communication network connected to the respective UEs 50. In particular, the macro node 100 may be implemented as base station or eNodeB and/or control node. Micro nodes may generally be implemented as relay nodes, in particular in a co-channel setup as shown. To each node 10, 20 there may be associated or connected an antenna arrangement, e.g. an antenna array (not shown). Each node may have associated or connected to it its own antenna arrangement.

Figure 2:
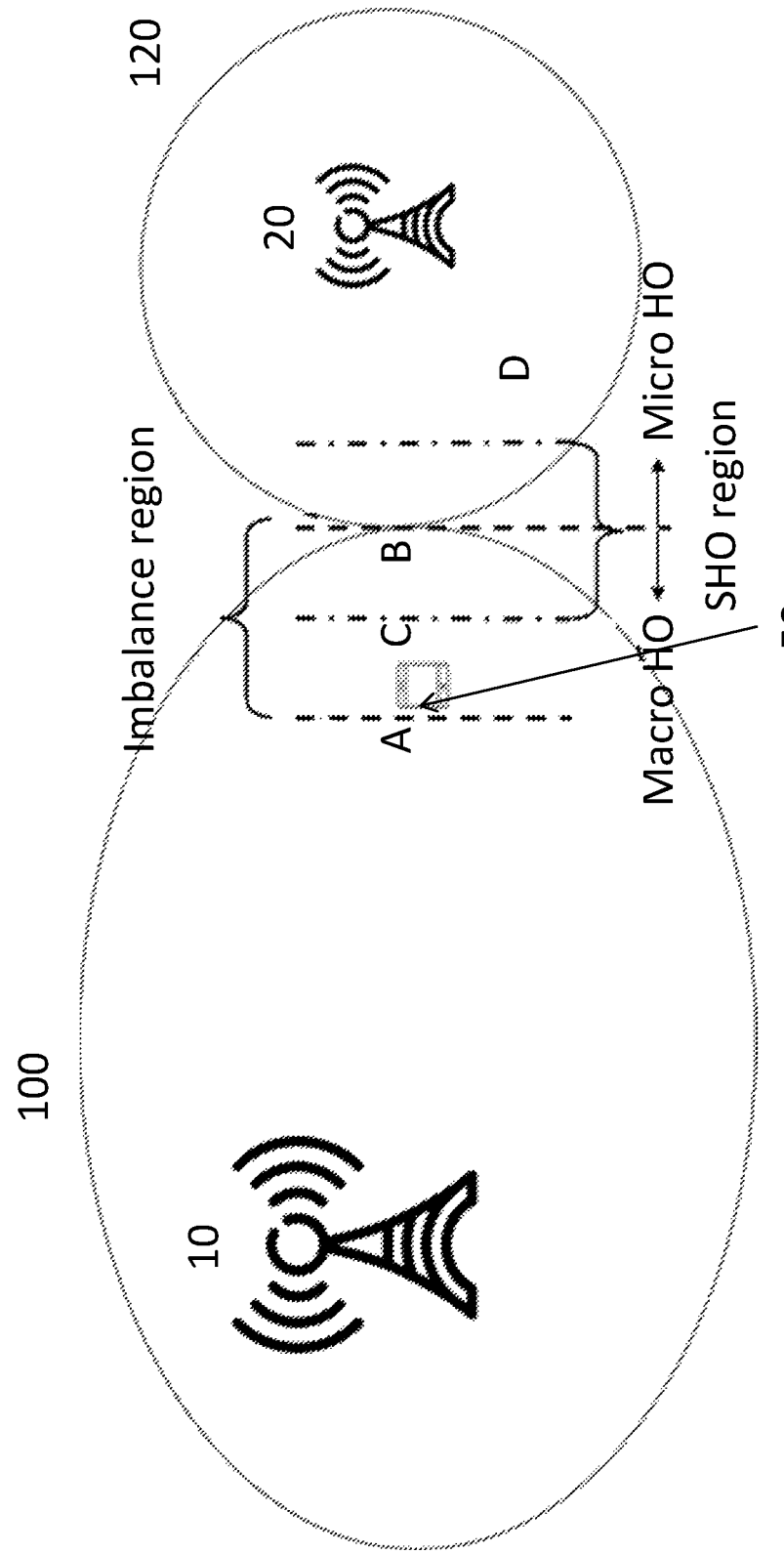
FIG. 2 an imbalance region of a heterogeneous wireless communication network.

FIG. 2 shows a setup without BF in which an UL/DL imbalance region occurs between macro cell 100 and micro cell 120 respectively between corresponding node 10 and node 20; a similar setup may occur between different macro cells, depending on their arrangement and/or transmission (DL) power and/or DL pathloss to the user equipment. A soft handover region SHO exists between the nodes 10, 20. If the UE 50 moves inside the SHO and imbalance regions, frequent undesired handover of the serving role of the nodes may occur. In this example, macro HO refers to the macro node 10 taking over as serving node, and micro HO refers to the micro node 10 taking over as serving node while. If the UE leaves the SHO region, it may leave soft handover mode. Line A represents the optimal UL handover border or the edge of equal UL pathloss between the nodes, at which soft handover based on UL would be advantageous. Due to the imbalance, this is outside the actual SHO region. Line B represents the optimal DL handover border or the edge of equal DL received power. B and C represent borders or edges of the SHO region.

There are disclosed examples of methods to reduce the UL/DL imbalance in particular in heterogeneous networks for at least one selected UE. The at least one selected UE may be identified or determined in an imbalance region and/or a node of the wireless communication network, e.g. a control node or base station, and/or the UE may determine an UL/DL imbalance of the user equipment.

Thereafter, beam forming (BF), in particular DL BF (transmitting to the user equipment) and/or UL BF (receiving from the user equipment) may be applied to and/or controlled for one or more than one of the nodes connected to the user equipment, in particular simultaneously or jointly, e.g. utilizing the antenna arrangements of more than one node connected to the user equipment, which may be controlled by a control node, e.g. a macro node or base station, which may be one of the nodes connected to the user equipment. In particular, beam forming may be performed jointly utilizing a macro and the LPN based on the connection status of at least one (other) user equipment, in particular if it does not negatively affect the user performance of the other UEs connected to the macro and the LPN.

It may be considered to control beam forming of the user equipment, if it has a suitable antenna array with more than one antenna elements. Such beam forming may be controlled to form a transmitting beam or pattern and/or receiving beam or pattern covering at least one of the nodes the UE is connected to. In this case, the UE may be seen as control node as described herein and may comprise the features of any of the control nodes as described herein. Alternatively or additionally, there may be considered a user equipment adapted to determine, and/or comprising an imbalance determining module for determining, an UL/DL imbalance with at least one of at least two nodes the user equipment is connected or connectable to. The user equipment may be adapted to transmit, and/or comprise a transmitting module for transmitting, imbalance information based on the determining to at least one node of the wireless communication network, in particular to a control node.

If the BF is successful, the imbalance will be removed or reduced and the UE will enter SHO. The performance of the beam forming and/or the connection status of the user equipment and/or other user equipments may be monitored, e.g. by a control node, to identify when the BF should be changed or disabled.

The method may be adaptive, and/or the control node may be adapted correspondingly, to balance the need for reduced imbalance and to keep the coverage and capacity unaltered when imbalance reduction is not needed. In FIG. 3, an example where BF is used to reduce the imbalance region is shown. 100a and 120a illustrate schematically the changed cells when beam forming is performed utilizing the antenna arrangements of both the macro node 10 and the micro node 20. Beam forming is controlled such that the SHO region and the imbalance region overlay and/or that lines A and D fall together.

A first step may be to identify or determine the UL/DL imbalance of a UE 50 and/or if a UE 50 or more than one UEs 50 is/are in an imbalance or in an imbalance region. The following approaches for this identification are suggested as examples, which may performed individually or in any combination. The nodes, in particular macro node 10 and micro node 20, and/or user equipment may be adapted to transmit and/or communicate and/or exchange relevant information or data.

Identification or determination may be done by classifying UEs 50 in SHO (between macro node 10 and a LPN 20) as having high imbalance; this may involve determining the location and/or connection status of the respective UE 50, e.g. in respect to the macro node 10 and the LPN 20.

Identification or determination may comprise UL or DL measurements at the macro and LPN and/or the UE. E.g., the difference in UL pathloss may be measured or estimated. Measurement results or respective data may be communicated between the nodes 10, 20 and/or the user equipment 50, in particular (and more generally) to a node implemented as a control node or base station, in this example macro node 100. Identification or determination may be done by the UEs, where the imbalance may be determined, e.g. by corresponding circuitry and/or a corresponding imbalance determining module, from the received CPICH signal strength and knowledge of used CPICH powers at Macro and LPN. In this case signaling would be needed to notify the network that a UE has classified itself as suffering from high imbalance, e.g. via a transmitting module of the UE.

If UEs 50 in the imbalance area are discovered or determined, the next step may comprise estimating and/or determining the locations of the UEs 50, e.g. all UEs spatial location. This may for example be done by either or a combination of the following approaches:

Location determining of a UE may comprise UE positioning techniques such as mobile tracking together with the knowledge of the macro and LPN positions and/or comprise satellite navigation information, e.g. from GPS or Galileo.

Alternatively or additionally, location determining may be based on fingerprint information from the UE (e.g. RRC measurements). The UE fingerprint may for example be defined as the N strongest neighbor cells DL measurement (for example CPICH RSCP), together with uplink pathloss to the these cells, e.g., Fingerprint=(cell 1 RSCP, cell 2 RSCP, . . . cell N RSCP, cell 1 UL pathloss, cell 2 UL pathloss, . . . , cell N UL pathloss). Fingerprint information may indicate such fingerprint. Suitable measurements may be performed and/or communicated by the nodes, e.g. the macro node 10 and the micro node 20, and/or the UE. The value of N will influence the accuracy of the position estimate of the UE. The fingerprint is the mapped to a spatial position using an historical database of fingerprints at different spatial locations.

The UE may be configured to perform event triggered measurement reporting, e.g. triggered when UE is close to the macro node or base station 10, e.g. within a pre-determined distance and/or within a pre-determined spatial region, which may be a region between two nodes, e.g. macro node 10 and micro node 20. In this context, there may be no need for high accuracy of the position estimates or locations determined if the UE is outside this region and/or relatively far away from the nodes, e.g. the macro node. Periodic measurement reports may be activated on the user equipment or one of the nodes, e.g. when the imbalance exceeds a threshold and/or the UE is within the pre-determined distance or spatial region. Generally, it may be considered to increase the accuracy of the position estimate or location determining when the UE is close to or within the imbalance area or region, in particular compared to the accuracy if the UE is far or out of the imbalance region. In a similar fashion, periodic measurement reports may be de-activated when the imbalance is below the threshold. Alternatively or additionally, the rate of the periodic measurement reports could be different in the two regions, in particular higher in the imbalance region and lower outside the imbalance region.

The network, e.g. a control node or macro node 10, may control beam forming based on the imbalance determining. In particular, the network or control node may be adapted to make an evaluation of whether the UEs currently connected to the macro and the micro node 20 or LPN would benefit from BF. This may include evaluating benefits for the UEs experiencing UL/DL imbalance and may optionally evaluating connection statuses of other UEs, e.g. potential losses for UEs when beam forming is performed. The evaluating may be part of controlling beam forming and/or include evaluating connection status. It may be considered that, as a general matter, controlling beam forming and/or evaluating benefits is based on and/or targeted at setting and/or achieving and/or optimising one or more optimisation and/or performance parameters, e.g. cell edge throughput, for one or more than one UEs. For example, evaluation may comprise estimating and/or calculation and/or predicting the effect of different BF choices on the performance for the user equipment and/or other user equipments. The predicted or estimated performance may be (highly) dependent on the UE distribution, in particular spatial distribution, and/or traffic load and/or the performance that is targeted. For example, if the load is high in areas where the BF would have negative effect, the gain for the UEs in the imbalance regions might not make up for the loss for the other UEs. Also, the type of performance metric that is targeted may have a large impact. If the cell edge throughput (UEs with worst performance) is the target, BF will probably have a higher chance to be successful. Depending on the current UE distribution and traffic load and the chosen performance metric an optimal BF may be determined as part of controlling beam forming and/or evaluating connection statuses.

If it is predicted that the optimal BF would be beneficial, the network may turn on and/or control BF for at least on node, e.g. the macro node 10 and/or the micro node 20. The BF may be applied to all DL channels (i.e. CPICH, HS-DSCH, etc.) aka as cell shaping. Another possibility is to tune the antenna tilt as part of beam forming. Note that at the macro node 10, the BF may aim to reduce the DL signal strength at the imbalance region (i.e. at the suffering UEs spatial location) and/or the LPN may aim to increase the DL signal to the UE in the imbalance region.

When BF has been activated, the performance may be monitored, e.g. by a base station or control node, for example the macro node 10, to confirm that the BF has a positive effect, e.g. by suitable measurements. If not, the BF is de-activated. If the BF is successful the UL/DL imbalance is removed or lowered, and the UE may enter SHO. If the UE does not enter SHO, there may be a significant imbalance left, and a more well-tuned BF scheme may be applied.

BF may be turned off and/or controlled off when the said UE leaves SHO (for example a corresponding message is received by a control node, e.g. the macro node 10) plus some margin, e.g. a buffer time. BF may alternatively or additionally be turned off and/or controlled off if the predication indicates that other UEs are too negatively affected.

Since the UE distribution and traffic load may change over time, continuous monitoring and prediction may be performed. Note that this may imply that instead of de-activating BF, new optimisation may be performed and/or new optimal pre-coding vectors and/or beam forming control options may be found and/or determined for controlling BF. In this case, the BF may be changed or controlled to the new optimal BF. It should be noted that in this invention, BF is applied to all DL channels. Since this will change the cell shape it may also impact (trigger) handover. Prior knowledge of the possible cell shapes available with BF and knowledge of the UEs location may aid the network to make optimal decisions of if and how to enable BF. Corresponding pre-determined information may be stored in a suitable storage, which may be accessible to a control node controlling BF.

Figure 4:
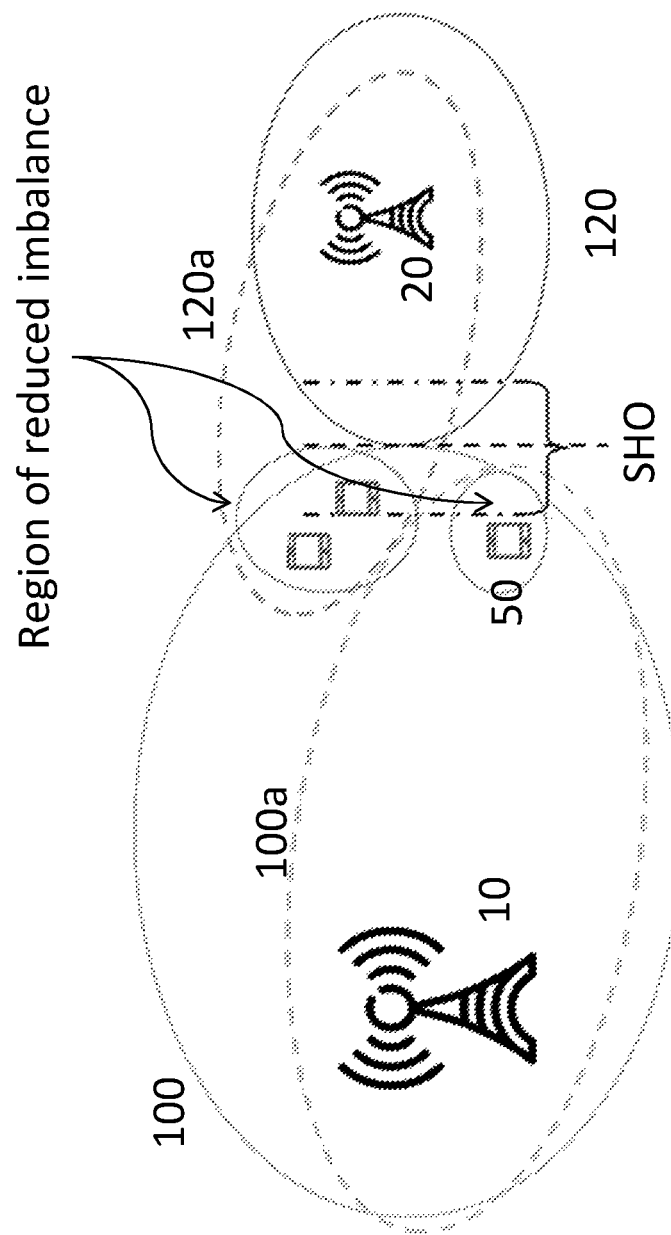
FIG. 4 the effect of beam forming in another setup.

FIG. 4 illustrates an example where BF is applied to reduce UL/DL imbalance for some UEs 50 while at the same time removing another UE from the SHO region and thereby also removing or lowering the UL/DL imbalance. The changes to the cells 100 and 120 are indicated as 100a and 120a.

Figure 5:
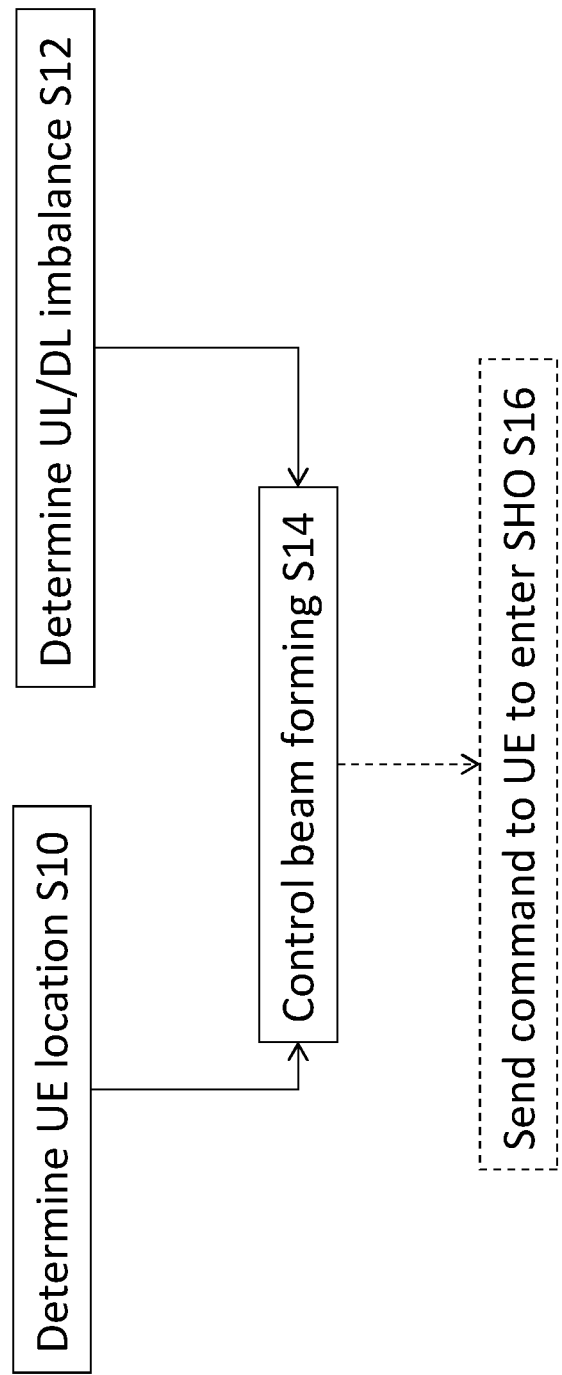
FIG. 5 schematically a method for beam forming.

FIG. 5 shows an example of a flowchart for a method for beam forming, which may be performed by or in a wireless communication network or control node, in particular if the network comprises at least two nodes connected to the user equipment. The user equipment may be a user equipment 50 and/or the nodes may be nodes 10, 20 as described above. The network may comprise the control node, which may be separate from the nodes connected to the user equipment or be one of these nodes. The method may comprise a step S10 in which the location of a UE is determined and a step S12 in which an UL/DL imbalance of the UE is determined. S10 and S12 may be performed separately or in combination. It may be considered that determining the imbalance (S12) includes determining the location (S10). Based on S10 and S12, beam forming is controlled in S14. Optionally, it may be considered that a command to enter SHO is send to the user equipment in S16, e.g. by a control node.

Figure 6:
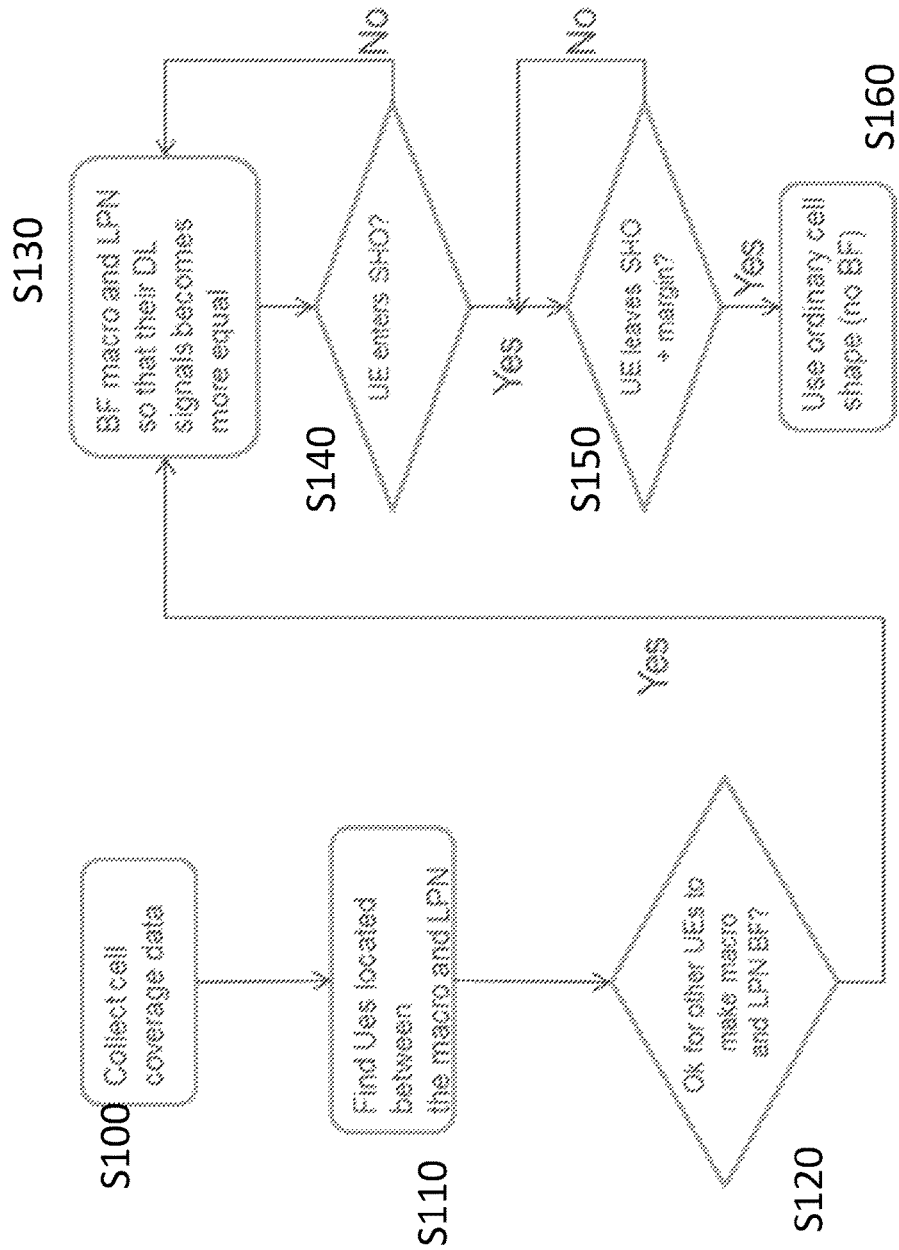
FIG. 6 a flowchart for beam forming.

FIG. 6 shows an algorithm flowchart as an example of a method for beam forming. Historical cell coverage data, for example RSCP and fingerprint information may be collected or pre-determined and stored (S100).

UEs located in the imbalance region may be identified or determined or found in S110 (location and/or imbalance determining may be performed), e.g. based on RSCP and UL pathloss. The imbalance region may be located between two nodes the UE is connected or connectable to, e.g. a macro node 10 and a micro node 20. If it is determined that UE(s) is/are in the imbalance region, the positions of UEs in the macro and LPN may be located and/or their location may be determined.

In S120, it may be determined if BF may be performed without unduly limiting the performance for other UEs, which may be part of evaluating the connection status of other UEs. Beam forming may be controlled (S130), including predicting performance for different BF alternatives for chosen performance metric (which may be seen as optimising). If no gain or improvement is expected, the method may stop or return to step 100. Beam forming may be controlled to change the UL/DL imbalance for at least one UE, in particular to equalise the UL/DL imbalance. In particular, if a gain or improvement is predicted, BF is applied or controlled according to the optimal BF predicted or calculated.

Performance of the controlled BF may be monitored and/or evaluated, e.g. as described in the following. If the UE does not enter SHO (no gain from BF), which may be determined in S140, then it may be returned to S120 or S130 to perform a new optimisation and/or determine and/or control a more well-tuned BF.

If UE enters SHO (S140), the BF may be considered to be sufficient. The performance is monitored as UE distribution and traffic load changes over time, in particular including determining if the UE stays in SHO or leaves SHO (S150).

Monitoring may lead to a return to step S120 or S130, and/or include predicting and/or comparing performance of BF alternatives (e.g. by returning to S120 or S130).

If UE leaves SHO, BF may be disabled (S160) based on the leaving plus a margin, which may be a time interval or buffer time. It may be considered to stop BF if other UEs are too negatively affected, which may be periodically and/or continuously checked as part of monitoring and/or by returning or repeating S120 and/or S130.

Accordingly, the UL/DL imbalance may be reduced, which hence may reduce the problems resulting from imbalance and limit the needs for other methods. Depending on embodiment, the concept may be implemented with different degrees of UE involvement and standardization. Hence, it may be implemented solely in the network, e.g. with a control node and/or base station, without any new standardization. For higher efficiency, new measurements and signaling may be introduced. Furthermore, the concept is highly adaptive to traffic load, user distribution and network layout.

Figure 7:
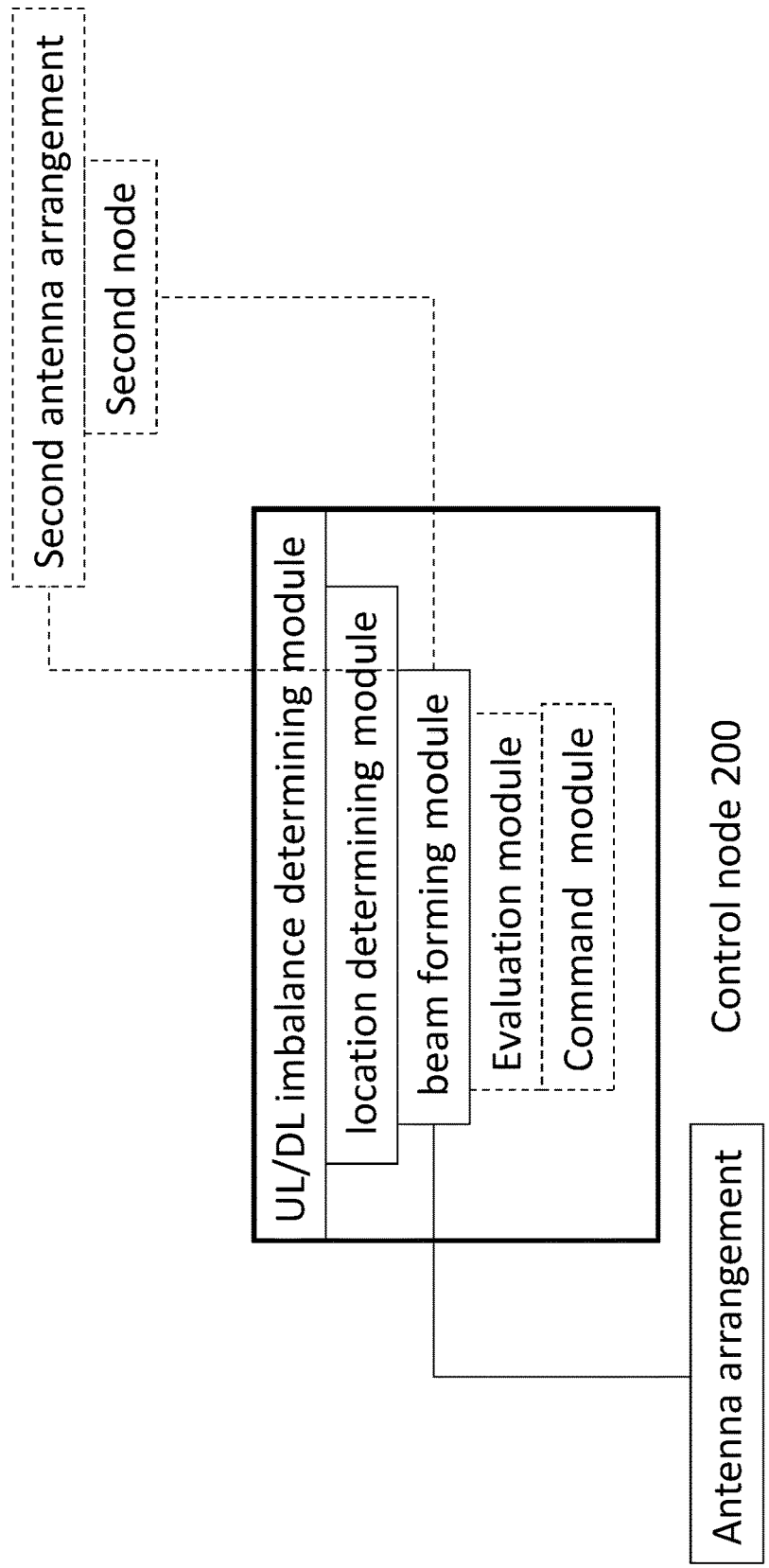
FIG. 7 an example of a control node.

FIG. 7 shows an example of a control node 200 comprising an UL/DL imbalance determining module as described herein. The control node may also comprise a location determining module and a beam forming module as described herein. Optionally, the control module may comprise an evaluation module and/or a command module as described herein. The control node 200 may be connected or connectable and/or comprise an antenna arrangement and/or be adapted to control and/or utilize the antenna arrangement, in particular for transmitting to and/or receiving signals from a user equipment. The control node 200, in particular the beam forming module, may control beam forming utilizing the antenna arrangement. Alternatively or additionally, the control node 200 and/or the beam forming module may be adapted to control or utilize a second antenna arrangement for beam forming. The second antenna array may be associated to a second node, e.g. be connected to or comprised in the second node. The control node 200 or the beam forming module may be adapted or connected or connectable to directly control or utilize the second antenna arrangement and/or to indirectly control or utilize the second antenna arrangement, e.g. by instructing or controlling the second node, which in turn may correspondingly control or utilize the antenna arrangement.

Figure 8:
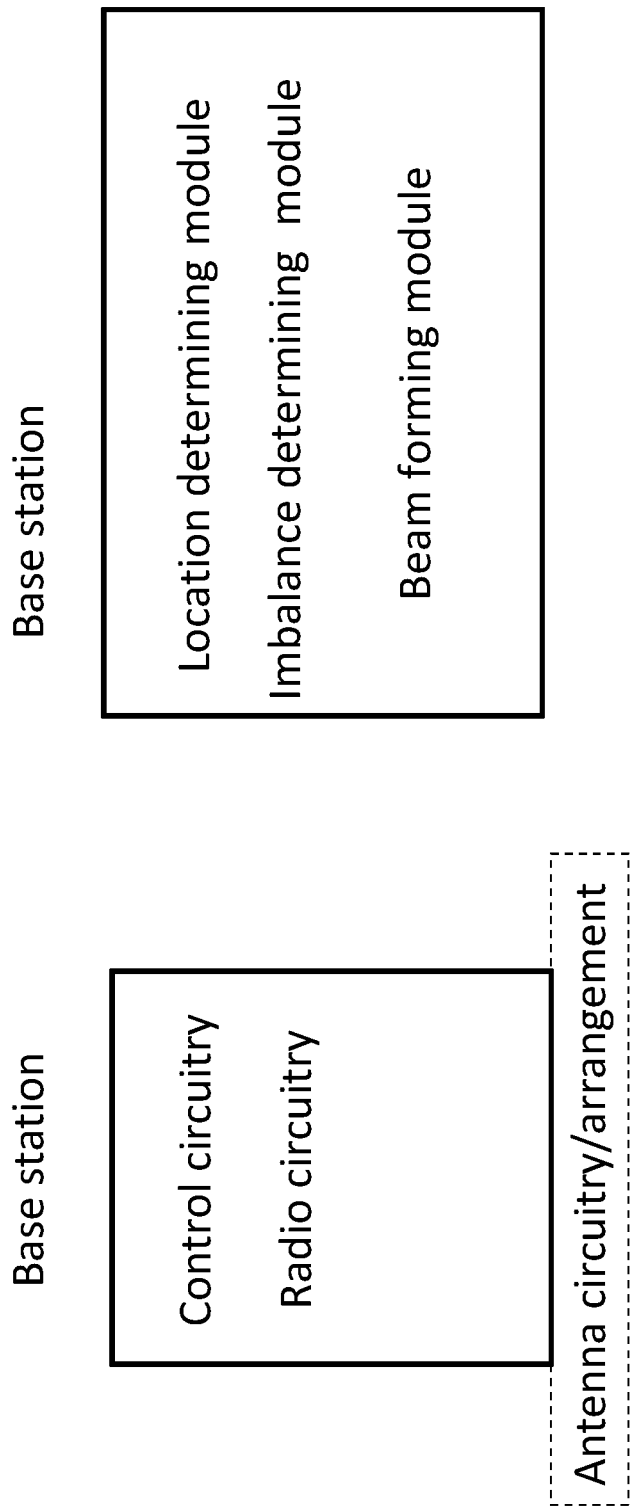
FIG. 8 examples of a base station.

FIG. 8 shows schematic examples of a base station, which may be a macro node 10 and/or eNodeB. To the left, there is shown a base station comprising control circuitry and radio circuitry as described herein. Optionally, the base station may comprise or be connected to antenna circuitry or an antenna arrangement as described herein. On the right, there is shown another example for a base station as described herein. The base station comprises a location determining module, a location determining module as well as a beam forming module. The base station may be connected or comprise an antenna arrangement or antenna circuitry as described (not shown).

Figure 9:
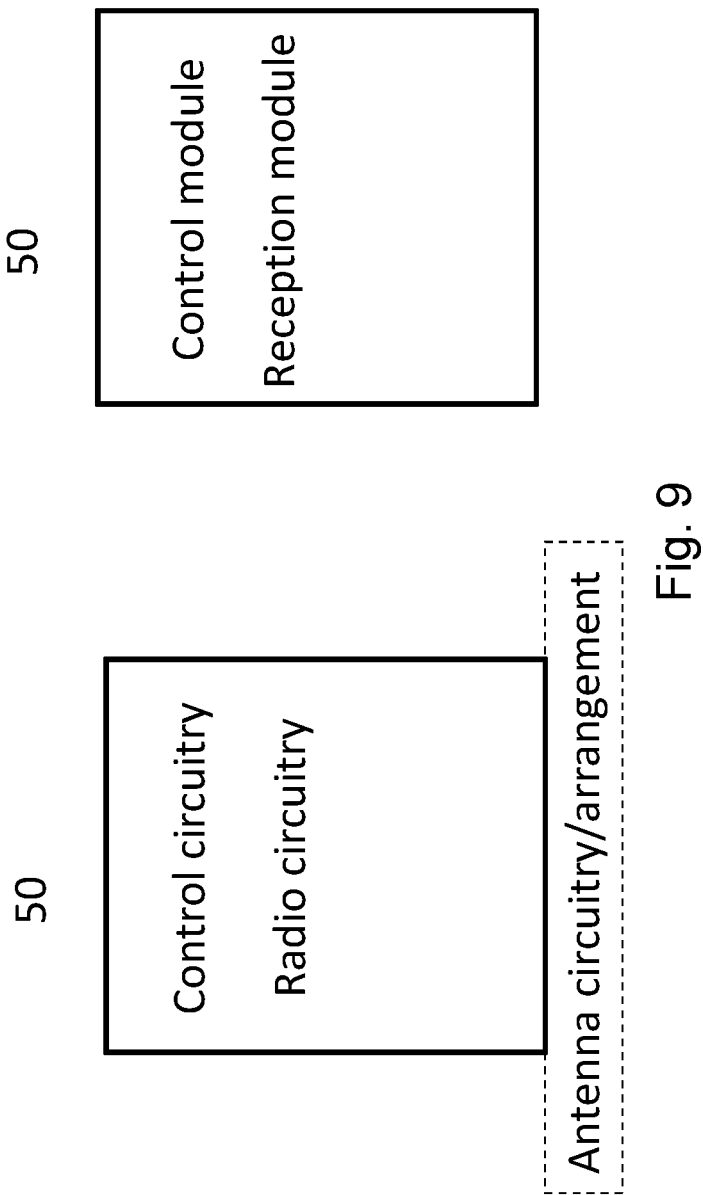
FIG. 9 examples of a user equipment.

FIG. 9 shows schematic examples of a user equipment 50. To the left, there is shown a user equipment comprising control circuitry and radio circuitry as described herein. Optionally, the user equipment may comprise or be connected to antenna circuitry or an antenna arrangement as described herein. On the right, there is shown another example for a user equipment as described herein. The user equipment may comprise a control module as described herein and a reception module as described herein. The user equipment may be connected or comprise an antenna arrangement or antenna circuitry as described (not shown).

A node in and/or of and/or for a wireless communication network may generally be or comprise a device adapted for wireless communication with at least one further entity or device or node adapted for wireless communication, in particular with a terminal or user equipment. Wireless communication may generally refer to communication via radio waves, in particular in the context of mobile and/or cellular telecommunication.

In the context of this specification, wireless communication may be communication, in particular transmission and/or reception of data and/or messages and/or signals, via electromagnetic waves, in particular radio waves, e.g. utilizing a radio access technology (RAT). The communication may be cellular communication and/or for and/or involve at least one terminal or user equipment and/or at least one nodes of a wireless communication network, which may be a cellular network. A communication may generally involve transmitting and/or receiving messages, in particular in the form of packet data. A message or packet may comprise control and/or configuration data and/or payload data and/or represent and/or comprise a batch of physical layer transmissions. Communication may be in one or more radio or frequency bands or carriers, which may be licensed public bands and/or within such bands, and/or may be controlled and/or scheduled according to a pre-defined standard, in particular a telecommunication standard like LTE.

Generally, a wireless communication network may refer to a network of nodes enabled to communicate and/or communication with each other at least partly via a wireless connection, e.g. via a radio connection, in particular using radio access technology and/or in a cellular arrangement or network. A wireless communication network may generally be a cellular network and/or implement one or more radio access technologies (RAT), e.g. WiFi, cdma, UTRAN, GERAN, and in particular E-UTRAN/LTE. A wireless communication network may in particular be a radio access network for wireless or mobile telecommunication, in particular according to LTE and/or UTRAN and/or E-UTRAN. A node for and/or of a wireless communication network generally may comprise radio circuitry, which generally may comprise a transmitter and/or receiver and/or transceiver, the latter of which may be arranged for transmitting and receiving signals. A node generally may comprise control circuitry to control the radio circuitry and/or operation of the node and/or methods carried out in the node, in particular receiving and/or transmitting and/or processing of signals, e.g. by encoding and/or decoding signals and/or scheduling of signals, e.g. according to a predetermined and/or provided and/or predefined schedule, in particular the methods or parts or steps of the methods described herein. Control circuitry may comprise integrated circuitry, in particular a processing arrangement, which may include one or more processing units or devices adapted for controlling the member and/or radio circuitry as described herein. The processing arrangement and/or a processing unit may comprise integrated circuitry, for example at least one of a microprocessor and/or processor core and/or microcontroller and/or ASIC (Application-Specific Integrated Circuit) and/or FPGA (Field-Programmable Gate Array), etc. The control circuitry and/or processing arrangement may comprise and/or be connected or connectable to a memory arrangement, which may be adapted to store data and/or instructions executable by the processing arrangement. The control circuitry and/or processing arrangement and memory arrangement may be arranged such that the control circuitry and/or processing arrangement and/or at least one processing unit may access the memory arrangement to read and/or to write, in particular to read instructions and/or corresponding data. Generally, control circuitry may comprise hardware and/or firmware and/or software, the latter of which may be executable on the hardware, which may comprise integrated circuitry, e.g. control circuitry and/or radio circuitry, as mentioned herein.

A or each node for or of a wireless communication network and/or in a wireless communication network and/or involved in wireless communication may comprise radio circuitry and/or control circuitry and/or antenna circuitry, which may be arranged to utilize and/or implement one or more than one radio access technologies. Radio circuitry of a node may generally be adapted for the transmission and/or reception of radio waves, and in particular may comprise a corresponding transmitter and/or receiver and/or transceiver, which may be connected or connectable to antenna circuitry, which may comprise and/or be connected or connectable to an antenna arrangement, and/or control circuitry. Control circuitry of a node may comprise a controller or processing arrangement and/or memory arranged to be accessible for the controller for read and/or write access. Control circuitry, in particular a controller, may be arranged to control the communication and/or the radio circuitry and/or antenna circuitry and/or an antenna arrangement and/or provide additional services. Circuitry of a node, in particular control circuitry, e.g. a controller, may be programmed or programmable to provide the functionality described herein. A corresponding program code may be stored in an associated memory and/or storage medium and/or be hardwired and/or provided as firmware and/or software and/or in hardware. Control circuitry, in particular a controller, may generally comprise a processor and/or microprocessor and/or microcontroller and/or FPGA (Field-Programmable Gate Array) device and/or ASIC (Application-Specific Integrated Circuit) device. More specifically, it may be considered that control circuitry comprises or may be connected or connectable to memory, which may be adapted to be accessible for reading and/or writing by the controller and/or control circuitry. Radio access technology may generally comprise GERAN and/or UTRAN and/or in particular E-UTRAN and/or be implemented according to LTE. A communication may in particular comprise a physical layer (PHY) transmission and/or reception, onto which logical channels and/or logical transmission and/or receptions may be imprinted or layered. A node, in particular a node for a wireless communication network, may be a user equipment and/or mobile terminal, or a node with controlling functions and/or stationary or semi-stationary node, e.g. a macro node and/or a base station and/or node with controlling and/or resource allocation and/or relay functionality, e.g. an eNodeB or macro node, or a low-power node (LNP), e.g. a micro, femto or pico node or relay node.

Control and/or configuration data may refer to data pertaining to the process of communication and/or nodes of the communication. It may, e.g., include address data referring to a node or terminal of the communication, and/or data pertaining to a transmission or reception mode and/or power and/or spectral configuration and/or frequency and/or coding and/or timing and/or bandwidth and/or data pertaining to the process of communication or transmission, e.g. in a header. Control and/or configuration data may comprise allocation data for allocating resources, in particular if the control and/or configuration data is DL data, which may be transmitted from a node like a base station to a terminal like a user equipment. It may be considered that control and/or configuration data comprises measurement data and/or data regarding communication quality or mode and/one or more requests, e.g. for resource allocation, in particular if the control and/or configuration data is UL data, which may be transmitted from a terminal like a user equipment to a node like a base station.

Generally, UL may indicate an uplink or uplink connection, which in particular may refer to the direction of wireless transmission of signals from a user equipment to one or more nodes of a wireless communication network, e.g. a macro node and/or a LPN. DL may indicate a downlink or downlink connection, which may refer to the direction of wireless transmission of signals from one or more nodes of a wireless communication network to a user equipment. A downlink or downlink connection may more generally refer to a wireless communication connection and/or transmission such that the receiving entity like an user equipment or a node is closer, in particular in terms of the layout or hierarchy of the network, to the user equipment or user equipment layer than the transmitting node and/or such that a user equipment is the receiving entity. Analogously, an uplink or uplink connection may more generally refer to a wireless communication connection and/or transmission such that the receiving entity or equipment or node is further distant from the user equipment in particular in terms of the layout or hierarchy of the network, than the transmitting node and/or such that the user equipment is the transmitting entity.

A user equipment (UE) may generally be a terminal and/or device configured for wireless communication and/or a terminal for a wireless communication network and/or cellular network, in particular any device providing a terminal or end point of or for a wireless communication and/or for communication via a wireless communication network. A user equipment may comprise a computer or microprocessor-based device like a desktop computer or PC and/or a mobile terminal, for example a mobile phone, smart phone, tablet, PDA, etc. A device for machine-to-machine (M2M) communication, e.g. a sensor arrangement or a household machine, may be considered to be a terminal and thus may be seen as a user equipment in this context. It may be considered that a user equipment comprises radio circuitry and/control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application-Specific Integrated Circuit) device. It may be considered that control circuitry comprises or may be connected or connectable to memory, which may be adapted to be accessible for reading and/or writing by the controller and/or control circuitry. It may be considered that a user equipment is configured to be a user equipment adapted for LTE/E-UTRAN. A user equipment may be considered to be wirelessly connected to a node of a wireless communication network if it is able to communicate with the node, in particular, if it registered to the wireless communications network to communicate with the node. A user equipment may be considered to be connectable to a node if it is adapted to be able to be connected.

A node of or for a wireless communication network may be a base station or macro node, in particular configured for and/or to enable and/or to facilitate and/or to participate in and/or wireless communication. Generally, a node for or of the wireless communication network like a base station or macro node may be arranged to communicate with a core network and/or to provide services and/or provide and/or support or extend at least on cell for cellular communication and/or control to one or more user equipments, e.g. by allocating resources, and/or to relay and/or transport communications and/or data between one or more user equipments and a core network and/or another base station or node of or for the wireless communication network and/or provide one or more cells for wireless communication. The base station may be adapted to allocate resources for the wireless communication and/or schedule transmissions and/or reception resources, e.g. for enabling and/or facilitating and/or controlling. A control node may be a node for or of a wireless communication network adapted to control signaling utilizing an antenna arrangement, in particular to control beam forming. The control node may be adapted to control and/or utilize on or more than one antenna arrangements. A control node may be adapted to control time- and/or frequency-domain beam forming, e.g. by implemented corresponding circuitry.

An antenna arrangement may comprise at least two antennas or antenna elements, which may be controlled or controllable individually or separately, in particular by a first node or control node. The antenna arrangement may comprise at least one antenna array, which may comprise a one-, two- or three-dimensionally arranged set of antenna elements. Alternatively or additionally, the antenna arrangement may be arranged at different locations, e.g. associated and/or connected to different nodes. Control of an antenna arrangement may comprise providing the antenna arrangement and/or its individual antenna elements with current and/or voltage for transmission according to a control scheme, e.g. for beam forming, and/or sampling and/or evaluating current and/or voltage in the antenna arrangement and/or its individual antenna elements for reception according to a control scheme, e.g. for beam forming. Utilizing an antenna arrangement for signaling may comprise controlling the antenna arrangement to transmit and/or receive signals and/or for wireless communication. Utilizing and/or controlling an antenna arrangement may comprise utilizing and/or controlling antenna circuitry connected and/or associated to the antenna arrangement for transmitting and/or receiving signals utilizing the antenna arrangement. Utilizing and/or controlling generally may be performed directly, e.g. by a node directly connected or connectable to the antenna arrangement, and/or indirectly, e.g. by a first node or control node signaling to and/or communicating with and/or controlling a different node which is connected to the antenna arrangement to be controlled or utilised. A control node may be adapted to directly and/or indirectly control a different node like a first node and/or second node, e.g. by messaging and/or RRC control or signaling.

Different types of nodes of a wireless communication network, e.g. macro node, low-power node like micro node, pico node or femto node, may be distinguishable by different transmission capabilities, in particular regarding transmission power, e.g. maximum or nominal transmission power. A macro node may have a higher transmission power than a low-power node.

Resources for wireless communication may generally comprise time-frequency resources, e.g. slots and/or subframes and/or frames and/or carriers and/or subcarriers and/or frequencies and/or frequency bands or bandwidth, in particular according to a given telecommunication standard, e.g. LTE.

Uplink/downlink imbalance (UL/DL imbalance) may refer to a situation regarding and/or a relationship between transmissions to a node from a terminal or user equipment (in the uplink) and the reception of signals from this node (in the DL) by the terminal or user equipment, in particular in regards to UL signal strength and/or the power transmitted in the uplink and signal strength and/or the power received in the downlink; the signal-to-noise ratio, in particular in DL, may be pertinent as well. It may be considered that an UL/DL imbalance is present and/or determined for a user equipment or terminal based on the relationship between the UL transmission (which may be characterised by one or more suitable parameters, e.g. pertaining to signal strength and/or transmitted power, and/or signal-to-noise ratio as received by the node and/or power received by the node) to the node and the DL reception from the node (which may be characterised by one or more suitable parameters, e.g. pertaining to signal strength and/or power received by the user equipment and/or signal-to-noise ratio as received by the user equipment and/or power transmitted by the node). For example, an UL/DL imbalance may depend on a ratio, in particular a signal strength ratio and/or power ratio of transmitted power (UL) and received power (DL), and/or a ratio of signal-to-noise ratios in uplink and downlink, fulfilling one or more set and/or pre-defined conditions. Such conditions may comprise e.g. the ratio, in particular the power ratio, being unequal to 1 and/or substantially different from 1, and/larger than a predetermined value or first threshold, or lower than a predetermined value or second threshold. The conditions and/or threshold may depend on characteristics of the node and/or the user equipment, in particular transmission and reception capabilities and/or sensitivity. The conditions and/or thresholds may differ for different user equipments and/or nodes. UL/DL imbalance may lead to undesired effects, in particular interference or frequent handovers. It may be considered that UL/DL imbalance refers to a situation in which a user equipment is connected to different nodes and/or in a soft-handover mode, in particular with nodes of a heterogeneous network. The UL/DL imbalance may refer to different UL conditions (e.g. regarding signal strength and/or signal-to-noise ratio and/or transmitting power and/or received power by the UL node) for different nodes the user equipment is connected to and/or different DL conditions (e.g. regarding signal strength and/or signal-to-noise ratio and/or transmitting power of the UL node and/or received power by the user equipment) for the different nodes the user equipment is connected to. In particular, an UL/DL imbalance may be determined (to be present) if the DL conditions of different nodes (e.g. parameters like the DL signal strength or signal-to-noise ratio and/or power received at the user equipment) have at least a threshold difference, e.g. a threshold ratio and/or the difference between the respective parameters is larger than a minimum threshold.

Controlling beam forming may be performed such that the UL/DL imbalance is reduced and/or removed, e.g. to equalize the DL conditions of different nodes. Generally, one or more than one node and/or antenna arrangement may be controlled or utilised for beam forming, e.g. a macro node and at least one micro node or LNP, which may be connected or connectable to the user equipment. It may be considered that the controlled or utilised nodes and/or antenna arrangements may be controlled jointly or separately, in particular to control or form independent beams from each node or antenna arrangement.

An eNodeB (eNB) may be envisioned to be an implementation of a base station, in particular a base station according to LTE. It may be considered that a base station such as an eNB is configured as or connected or connectable to an Evolved Packet Core (EPC), which may be part of a core network, and/or to provide and/or connect to corresponding functionality. The functionality and/or multiple different functions of a base station, in particular an eNodeB may be distributed over one or more different devices and/or physical locations. A base station or eNodeB may be considered to be a node of a wireless communication network. It may be envisioned that an eNodeB is implemented as a macro node of a wireless communication network.

A storage medium may be any kind of medium suitable to store instructions readable by control circuitry, e.g. a random-access memory and/or read-only memory and/or flash memory and/or non-volatile memory and/or optical storage medium like a CD or DVD and/or hard disk.

A beam covering a user equipment may be directed to the user equipment and/or define a spatial structure in which the user equipment is located.

Determination of the location of the user equipment and/or determination of the UL/DL imbalance may be performed by the base station described herein or the control node or control circuitry, or by a different node or circuitry, e.g. by a first node or second node or macro node or base station. The base station or control node or control circuitry may be adapted to receive corresponding data from one or more different nodes. Determination of the location and determination of the UL/DL imbalance may be performed on or by the same node or by different nodes, which may be part of the node arrangement.

Determination of a location of, and/or locating, a user equipment may comprise and/or be performed based on distance to one or more base stations or nodes with known location, e.g. by determining signal running times, and/or based on GPS-based information, e.g. on or by the user equipment. Alternatively or additionally, fingerprinting may be performed. Fingerprinting may comprise determining and/or receiving fingerprint information from the user equipment (e.g. RRC measurements). The fingerprint information may, e.g., comprise the N strongest neighbor cells DL measurement (for example CPICH RSCP for LTE), together with uplink pathloss to the these cells. Fingerprint information may be mapped to a spatial position using an historical database of fingerprints at different spatial locations, which may be pre-determined and/or stored in a storage or memory.

Determination of a location, e.g. by a node like a base station or control node or corresponding circuitry, may comprise receiving corresponding information, e.g. location information, from a different node, e.g. a base station and/or macro node and/or micro node connected to a user equipment and/or adapted, and/or comprising a location determining module, for locating the user equipment Determination of an UL/DL imbalance, e.g. by a node like a base station or control node or corresponding circuitry, may comprise receiving corresponding information, e.g. UL/DL imbalance information, from a different node, e.g. a base station and/or macro node and/or micro node connected to a user equipment and/or adapted, and/or comprising a location determining module, for detecting or determining the UL/DL imbalance of the user equipment. Determination of an UL/DL imbalance may comprise identifying if the user equipment is in an UL/DL imbalance region, which may be known to exist between nodes, in particular between nodes of a heterogeneous network. This may involve determining the location of the user equipment, in particular relative to the nodes it is connected to.

A node or node arrangement of the wireless communication network, in particular a base station, e.g. the first or second base station, or a control node as described herein, may be adapted, and/or comprise a command module, for transmitting a command to a user equipment based on the determination of an UL/DL imbalance and/or the determination of a location of the user equipment and/or the evaluation of the connection status of one or more user equipments. The command may instruct the user equipment to enter a soft handover mode. The user equipment may be adapted, and/or comprise a receiving module, for receiving the command and/or to carry out the command. In particular, the user equipment may comprise control circuitry and/or a UE control module for entering a soft handover modus in relation to at least two nodes of or for a wireless communication network, which may comprise base stations and/or a macro node and at least one LPN.

The connection status of a user equipment may refer to the user equipment being connected to one or more nodes for wireless communication and/or to which nodes the user equipment is connected to and/or which transmission and/or reception conditions it is operating in, e.g. which bandwidth and/or resources it uses and/or are allocated to it and/or it UL/DL imbalance situation. Evaluation of one or more connection statuses may refer to and/or comprise receiving and/or determining the one or more connection statuses, e.g. from one or more nodes the user equipment/s is/are connected to and/or or managing node, e.g. an RNC. A base station or node arrangement or control node (or the corresponding module or circuitry) may be adapted to control beam forming based on such an evaluation, e.g. taking into account the requirements and/or presence of other user equipments, and/or the effects beam forming may have on their connection statuses and/or operation conditions. Generally, beam forming may be performed such to more than one user equipment is covered by a transmission and/or receiving beam, if setup, in particular the antenna arrangement/s utilised allow this. In particular, the number of beams may be dependent on the number of individually controllable antenna elements. It should be noted that beam forming may increase the power density of and/or in a beam when transmitting, but this leads to a relative decrease of power density in other parts of the radiation pattern, if the totally transmitted power is not increased.

Soft handover (SHO), which may also be called soft handoff, may refer to a situation in which a terminal or user equipment is connected to more than one cell and/or network nodes or base stations, e.g. eNodeBs and/or macro nodes and/or low-power nodes. A soft handover may e.g. occur and/or be desirable in a heterogeneous network, e.g. in a co-channel arrangement of at least one macro node and at least one LPN. In soft handover, a terminal or user equipment may receive data from the plurality of network nodes it is connected to. In soft handover, one of the nodes the UE is connected to may be the controlling and/or serving node and/or provide a serving cell, whereas the node may be a non-serving node and/or provide a non-serving cell. There may be a spatial region associated to soft handover, in which a user equipment is in soft handover mode. The spatial region may be arranged between the nodes a user equipment is in soft handover with. In the region, there may be a serving change edge of the region, at which a change in serving node may occur, e.g., the function of serving node may go over from one node to the other. It may be considered to be advantageous to limit and/or minimize such changes of serving nodes in soft handover.

The modules and/or different circuitries described herein may be adapted to communicate and/or interface with each other, in particular to exchange data and/or information to facilitate their different functions, in particular if they are implemented on the same device or node or user equipment.

Some abbreviations used are:
BF Beam Forming
Rx receiver
SHO Soft HandOver/HandOff
KPI Key Performance Index (Indicator)
GPS Global Positioning System
DPCCH Dedicated Physical Control Channel
HS-DPCCH Dedicated Physical Control Channel for HS-DSCH
CQI Channel Quality Indicator
OSS Operations Support Systems
SFN Single-Frequency Network
SR Spatial Reuse
MIMO Multiple input multiple output
HSDPA High Speed Downlink Packet Access
HSPA High Speed Packet Access
HS-SCCH High speed shared control channel
HS-PDSCH High speed Physical data shared channel
HARQ Hybrid automatic repeat request
UE User Equipment
TTI Transmit Time Interval
PCI Precoding control index
Tx Transmitter
LPN Low-power Node
L1 Layer 1
RRU Remote Radio Unit
RNC Radio Network Controller
DL Downlink
WCDMA Wideband Code Division Multiple Access
3GPP 3rd Generation Partnership Project
CPICH Common Pilot Channel
P-CPICH Primary CPICH
S-CPICH Secondary CPICH

LIST OF REFERENCE NUMERALS

10 Macro node
20 Micro node/LPN
50 User equipment
100 Macro cell
120 Micro cell/LPN cell
200 Control node

The invention claimed is:

1. A method for beam forming in a wireless communication network, comprising:
determining an uplink/downlink (UL/DL) imbalance of a user equipment wirelessly connected or connectable to at least two nodes of the wireless communication network, wherein the at least two nodes comprises a first node and a second node, wherein the UL/DL imbalance being in respect to the at least two nodes;
determining a location of the user equipment; and
controlling beam forming based on the determined UL/DL imbalance of the user equipment that is connected or connectable to the at least two nodes and the determined location utilizing at least an antenna arrangement controlled by and/or associated to the first node.

2. The method of claim 1, wherein controlling beam forming comprises forming a transmission beam covering the user equipment, the power transmitted to the user equipment by the transmission beam being controlled based on the determined UL/DL imbalance.

3. The method of claim 1, wherein controlling beam forming comprises forming a receiving beam covering the user equipment.

4. The method of claim 1, wherein the wireless communication network comprises a heterogeneous network including at least the first node and the second node wirelessly connected or connectable to the user equipment, the first node and the second node differing regarding their transmission power for transmission to and/or distance from the user equipment and/or the power received by the user equipment from the first node differing form the power received by the user equipment from the second node.

5. The method of claim 1, wherein the first node and/or the second node is a base station of the wireless communication network.

6. The method of claim 1, wherein determining the location of the user equipment comprises fingerprinting.

7. The method of claim 1, wherein controlling beam forming is based on evaluating the connection status of a plurality of user equipments connected or connectable to the first node.

8. A node arrangement for a wireless communication network, comprising:
 an antenna arrangement connected or connectable to at least two nodes of the node arrangement, wherein the at least two nodes comprises a first node and a second node; and
 control circuitry of a control node of the node arrangement, the control circuitry being arranged to control signaling utilizing the antenna arrangement;
  wherein the control circuitry is adapted to control beam forming utilizing the antenna arrangement based on a determination of a location of at least one user equipment wirelessly connected or connectable to the node arrangement and based on a determination of an UL/DL imbalance of the at least one user equipment that is connected or connectable to the at least two nodes.

9. The node arrangement of claim 8, wherein the control circuitry is adapted to control beam forming such that a transmission beam covering the user equipment is formed, the power transmitted for the user equipment by the transmission beam being controlled based on the determined UL/DL imbalance.

10. The node arrangement of claim 8, wherein beam forming comprises forming a receiving beam and/or transmitting beam covering the user equipment.

11. The node arrangement of claim 8, wherein the antenna arrangement is connected to and/or comprised in the control node.

12. The node arrangement of claim 8, the node arrangement comprising a heterogeneous network including at least the first node and the second node wirelessly connected or connectable to the user equipment, the first and the second node differing regarding their transmission power and/or location.

13. The node arrangement of claim 8, the control node being a base station of the wireless communication network.

14. The node arrangement of claim 8, wherein the node arrangement is adapted to determine the location of the user equipment based on fingerprinting.

15. The node arrangement of claim 8, the control circuitry being adapted for evaluation, based on the connection status of a plurality of user equipments wirelessly connected or connectable to the node arrangement, of whether and/or how to control beam forming.

* * * * *